United States Patent [19]

Uchida et al.

[11] Patent Number: 5,997,917
[45] Date of Patent: Dec. 7, 1999

[54] PROCESSED OATS AND A METHOD OF PREPARING THE SAME

[75] Inventors: Toshiaki Uchida; Takae Ozawa, both of Kawagoe; Ken Takahashi, Tokorozawa, all of Japan

[73] Assignee: Snow Brand Milk Products Co., Ltd., Hokkaido, Japan

[21] Appl. No.: 08/921,248

[22] Filed: Aug. 29, 1997

[30] Foreign Application Priority Data

Aug. 30, 1996 [JP] Japan .................................... 8-248779

[51] Int. Cl.⁶ ....................................................... A23L 1/164
[52] U.S. Cl. ................................. 426/96; 426/92; 426/93; 426/455; 426/456; 426/457; 426/459; 426/463; 426/465; 426/468; 426/580; 426/615; 426/618; 426/621; 426/634; 426/651; 426/656
[58] Field of Search ................................. 426/92, 93, 96, 426/615, 618, 621, 455, 456, 457, 459, 463, 465, 468, 656, 651, 580, 634

[56] References Cited

U.S. PATENT DOCUMENTS 3,494,769  2/1970  Tressler .................................... 426/620
4,097,613  6/1978  De Lauder .............................. 426/303

OTHER PUBLICATIONS

"Hypocholesterolemic Effects of Beta–Glucans In Different Barley Diets Fed To Broiler Chicks", Nutrition Reports International, J. G. Fadel, et al., May 1987, vol. 35, No. 5.
"Determination of β–Glucan In Oats And Barley", Cereal Chem., vol. 54, p. 524, 1976, Wood P.J., Paton D., and Siddiqui I.R.
Changes In the Dietary Fiber Content of Oats With Extrusion Cooking And Their Effect on Cholesterol Metabolism in Rats, Nippon Eiyo Shokuryo/Gakkaishi, vol. 41, p. 449, 1988.
"Dose Response to A Dietary Oat Bran Fraction In Cholesterol–Fed Rats", Fred L. Shinnick, et al., Jan. 4, 1990.
"Epidemiology Of Cancer Of The Colon And Rectum", Denis P. Burkitt, Mar. 17, 1971.

*Primary Examiner*—Helen Pratt
*Attorney, Agent, or Firm*—Townsend & Banta

[57] ABSTRACT

Processed oats having a remarkably decreased viscosity when dispersed in hot water or boiling water, a method of preparing the same, and a food and beverage containing the same are disclosed. The processed oats may be prepared by contacting pressed oats with water or an aqueous protein solution and then drying the oats. The contacting of oats with the aqueous protein solution may be carried out before the pressing of the oats.

11 Claims, No Drawings

PROCESSED OATS AND A METHOD OF PREPARING THE SAME

BACKGROUND OF THE INVENTION

1. Field of the Invention

The present invention relates to new processed oats, especially to new processed oats having a remarkably decreased viscosity when the oats are dispersed in hot water or boiling water, to a method of preparing the same, and to a food and beverage containing the same.

Since the processed oats of the present invention have a remarkably decreased viscosity when the oats are formed into liquid, and further have a decreased oats odor, a decreased turbidity of the solution, and a decreased stickiness of oat grains produced when the oats are bitten, it is useful as a new oat material having new physical properties.

2. Prior Arts

Oats are known as a cereal food which is rich in proteins and minerals. Further, the oats have a large amount of dietary fibers and thus the oats have been used as an ideal cereal food for breakfast in European and American countries.

With regard to the oats, a therapeutical effect on constipation as an action of dietary fiber contained in oats (Burkitt D. P., Cancer, vol.28, p.3, 1971), and an decreasing effect on serum cholesterol value (Fadel J. G., Newman R. K., Newman C. W. and Barnes A. E., Nutr.Rep.Int., vol.35, p.1049, 1987; Shinnick F. L., Ink S. L. and Marlett J. A., J.Nutr., vol.120, P.561, 1990) etc. have been reported. Moreover, the inhibiting effect on cholesterol as an action of phytic acid contained in oats is also known. Thus the oats can be regarded as a highly estimated food from the viewpoints of nutritional science and physiology.

The oats have a composition comprising approx. 64% of carbohydrates, 11% of proteins, 9% of fats, 2.2% of soluble dietary fibers and 5.6% of insoluble dietary fibers (Oda Y., Aoe S. and Nakaoka M. et al., Nippon Eiyo Shokuryo Gakkaishi, vol.41, p.449, 1988). The oats, as the characteristics thereof, have a very high viscosity when dissolved in water, and a peculiar clinging stickiness. As a causative material for the stickiness of oats, β-glucan is known. The β-glucan contained in oats is approximately 3% (Wood P. J., Paton D., and Siddiqui I. R., Cereal Chem., Vol.54, p.524, 1976). Further, as the other causative material for the stickiness of oats, amylopectin and the like are known. These carbohydrates are stable against heat and the structures thereof are hardly changed.

The stickiness of oats are preferred as a characteristic of oats, and have been used as a food or a binding agent and thickening agent. However, on the other hand, there are people who hate the peculiar stickiness of oats. Thus a variety of forms of oats products have been developed so that the people could take oats.

For examples, there are disclosed that oats are treated by frying so as to obtain cakes or snacks for the purpose of obtaining oats flakes (Japanese Examined Patent Publication No.63-17421, Japanese Examined Patent Publication No.4-18815), and that oat raw grains are treated with an acid, steamed, and oils are added, and the grains are dried and pressed for the purpose of pregelatinizing the oats completely (Japanese Unexamined Patent Publication No.59-130147, Japanese Unexamined Patent Publication No. 59-130148, Japanese Unexamined Patent Publication No. 59-130149).

SUMMARY OF THE INVENTION

Thus an object of the present invention is to provide processed oats having a decreased viscosity when dispersed in hot water or boiling water.

Another object of the present invention is to provide a method of preparing the processed oats having a decreased viscosity when dispersed in hot water or boiling water.

Still another object of the present invention is to provide a food or beverage containing the processed oats having a decreased viscosity when dispersed in hot water or boiling water.

The present inventors have researched earnestly so as to provide oats having a decreased viscosity when dispersed in hot water or boiling water, and have found that processed oats having a remarkably decreased viscosity when dispersed in hot water or boiling water, by contacting pressed oats with water and drying the oats. Further, the inventors have found that the effect may be improved by contacting unpressed or pressed oats with an aqueous protein solution, and thus completed the present invention.

In accordance with the present invention, there is provided processed oats which are pressed, and a viscosity of a solution of which is 350 cP or less, wherein the solution is obtained by adding the processed oats to ten times as much as boiling water, heating at 100° C. for three minutes, and then maintaining at 60° C. for 20 minutes.

Further, there is provided processed oats which have a degree of pressing of 0.47 mm or less, and a viscosity of a solution of which is 180 cP or less, wherein the solution is obtained by adding the processed oats to ten times as much as boiling water, maintaining at 90° C. for three minutes, and then maintaining at 60° C. for 20 minutes.

Further, there is provided a method of preparing the processed oats comprising the steps of contacting pressed oats with water, and drying the oats.

Further, there is provided a method of preparing the processed oats comprising the steps of contacting pressed oats with an aqueous protein solution, and drying the oats.

Further, there is provided a method of preparing the processed oats comprising the steps of contacting unpressed oats with an aqueous protein solution, drying the oats, and then pressing the oats.

Further, there is provided a method of preparing the processed oats, wherein the aqueous protein solution is an aqueous animal protein solution.

Further, there is provided a method of preparing the processed oats, wherein the aqueous animal protein solution is an aqueous milk protein solution.

Further, there is provided a method of preparing the processed oats, wherein the aqueous protein solution is an aqueous vegetable protein solution.

Further, there is provided a method of preparing the processed oats, wherein the drying is carried out by means of microwave heating.

Further, there is provided a food and beverage containing the processed oats.

DETAILED DESCRIPTION OF THE INVENTION

The present invention will be detailed hereinafter.

The oats which may be used as a raw material in the present invention are not limited, but oat barley may be used. The oat barley may be used after drying raw grains, roasting, steaming with vapor and removing outer skin by means of a conventional method. The roasting is carried out to draw out fragrances of the oats, and the steaming is carried out to facilitate the removal of outer skin of oats and to deactivate enzymes such as lipase. Alternatively, commercially available oats may be used as they are.

In accordance with the present, the processed oats having a decreased viscosity when formed into liquid, may be obtained by contacting pressed oats with water or an aqueous protein solution, removing water and drying the oats.

The method of the pressing is not limited, and it may be carried out with a roller by a conventional method.

Oats may be contacted with water or an aqueous protein solution. However, the effect on decreasing viscosity of the oats when formed into liquid, were more improved by contacting the oats with an aqueous protein solution than with water, and thus an aqueous protein solution is preferable.

When an aqueous protein solution is used, a kind of protein is not limited, and an animal protein such as casein, whey protein concentrates (WPC), whey protein isolates (WPI), egg-white albumin, bovine serum albumin, plasma, myosin and actin, and a vegetable protein such as soy bean protein and wheat gluten, may be exemplified. Further, skim milk containing a milk protein such as casein and whey protein, and wheat flour containing a vegetable protein, may be used. Among them, an animal protein, in particular milk protein is preferable. Moreover, in view of shapes of proteins, a spherical shape of protein is preferable, and for examples, whey protein, casein, egg-white, plasma and soy bean protein may be exemplified.

Preferably, these proteins may be used by dissolving it in water so as to have a concentration of protein of 0.01 to 40 weight %. If the protein concentration is less than 0.01 weight %, the effect can not be obtained, and if the protein concentration is more than 40 weight %, the viscosity of an aqueous protein solution is increased, and it will become difficult for the solution to contact with oats homogeneously.

The protein may be used alone or in combination with another one or more proteins.

The amount of water or an aqueous protein solution which contacts with oats, may be an amount sufficient to moisten the oats, and 0.1 to 3 parts by weight of an aqueous protein solution to 1 part by weight of oats is preferable. If the amount of water or aqueous protein solution is less than 0.1 parts by weight oats, an sufficient effect can not be obtained, and if the amount is more than 3 parts by weight, starches or another polysaccharides contained in the oats will elute before processing, and a sufficient effect can not be obtained either.

As the method of contacting oats with water or an aqueous protein solution, a method which comprises immersing oats in water or an aqueous protein solution for few minutes is preferable, but water or an aqueous protein solution may be sprayed onto, the oats and steam may be jetted to the oats.

After contacting the oats with water or an aqueous protein solution in such a way, water is removed from the oats and the oats are dried. The drying of the oats may be carried out by a method such as air drying, freeze-drying and thermal drying. If the thermal drying is adopted, it is preferably carried out at a temperature at 400° C. or less, especially at 250° C. or less. If the drying is carried out at a temperature higher than 400° C., the surface of the oats is burnt, and reduction of the processed oats when added to milk or soup becomes worse, and thus it is not preferable. Further, if the thermal drying is carried out with microwave, water may be removed efficiently, and an effect on further decreasing the viscosity of the oats when formed into liquid may be obtained.

Alternatively, in accordance with the present invention, the processed oats having a remarkably decreased viscosity when formed into liquid, may be obtained by contacting oats with an aqueous protein solution before pressing, then removing water, drying and pressing the oats.

In the case, contacting of the oats with an aqueous protein solution, may be carried out at the time of the steaming, or before or after the steaming. Another conditions such as kinds of the proteins or the concentrations thereof, may be the same as in the above case where the pressed oats are contacted with water or an aqueous protein solution.

If the oats are contacted with an aqueous protein solution before pressing, the parts where the surface treatment has not been made are exposed after pressing, so that the effect on decreasing the viscosity of the oats when formed into liquid, is decreased a little compared with the case where the oats are contacted with an aqueous protein solution after pressing.

By contacting the oats with water and then drying as described above, the starch structure on the surface of the oat grain is changed. By contacting the oats with an aqueous protein solution, the surface of oat grain is covered with the protein, and the protein is gelled or degenerated, and elution of viscous materials within the oat grain is inhibited, thus the peculiar stickiness of oats may be degreased.

The processed oats of the present invention thus obtained have a decreased viscosity of a solution of the oats of 350 cP or less, wherein the solution is obtained by adding the oats to ten times as much as boiling water, heating at 100° C. for three minutes and then maintaining at 60° C. for 20 minutes.

If the degree of pressing is 0.47 mm or less, the processed oats have a decreased viscosity of a solution of the oats of 180 cP or less, wherein the solution is obtained by adding the oats to ten times as much as boiling water, maintaining at 90° C. for three minutes, and then maintaining at 60° C. for 20 minutes.

The processed oats of the present invention obtained by the above-mentioned methods, have a remarkably decreased viscosity when formed into liquid, and the reduction into hot water is excellent, and thus it may be used for the same usages as the conventional oats. Moreover, the processed oats of the present invention have a decreased oats odor and turbidity of the solution, and have a decreased stickiness occurred when the oat grains are bitten.

Therefore, the processed oats of the present invention have a preferable mouth feel for the people who hate the peculiar stickiness or oats odor and the like, and may be used by formulating in various foods and beverages such as 'Okayu' (gruel rice), 'Ochazuke' (rice-in-tea), risotto and soup.

Hereinafter, Test Examples and the results, in which treatment conditions which can decrease the viscosity of oats when formed into liquid effectively, were researched. In Test Examples, all '%' and 'part' are to show 'weight %' and 'part by weight' respectively, unless otherwise specified.

TEST EXAMPLE 1

The following processed oats were prepared using oats having a degree of pressing of 0.55 mm (manufactured by Quaker Oats), and viscosities thereof were determined.

Sample 1

Prepared by adding 1 L of water to 1 kg of the oats, and after one minute, freeze-drying 300 g of the oats.

Sample 2

Prepared by adding 1 L of water to 1 kg of the oats, and after one minute, treating 300 g of the oats at 130° C. for 30 minutes with an oven.

Sample 3

Prepared by adding 1 L of water to 1 kg of the oats, and after one minute, treating 300 g of the oats for 20 minutes with a microwave range.

Sample 4

Prepared by adding 1 L of 0.1% aqueous whey proten isolates (WPI: manufactured by Taiyo Kagaku Co., Ltd.) solution to 1 kg of the oats, and after one minute, freeze-drying 300 g of the oats.

Sample 5

Prepared by adding 1 L of 0.1% aqueous whey protein isolates (WPI: manufactured by Taiyo Kagaku Co., Ltd.) solution to 1 kg of the oats, and after one minute, treating 300 g of the oats at 130° C. for 30 minutes with an oven.

Sample 6

Prepared by adding 1 L of 0.1% aqueous whey protein isolates (WPI: manufactured by Taiyo Kagaku Co., Ltd.) solution to 1 kg of the oats, and after one minute, treating 300 g of the oats for 20 minutes with a microwave range.

Control

The above untreated oats having a degree of pressing of 0.55 mm.

Each 300 g of the oats of Samples 1 to 6 and of the Control were added to 3 L of boiling water, respectively. After maintaining at 100° C. for three minutes, the oats were cooled down to 60° C. maintained at 60° C. for the periods shown in Table 1, and the changes of viscosities were determined. The viscosities were measured with a B-type viscometer. Solids of the oats were removed as much as possible, and viscosities of solution parts were determined. The results will be shown in Table 1.

TABLE 1

| | Viscosity (cP) | | |
|---|---|---|---|
| | After 10 min. | After 20 min. | After 30 min. |
| Sample 1 | 125 | 350 | 490 |
| Sample 2 | 51 | 198 | 287 |
| Sample 3 | 33 | 96 | 176 |
| Sample 4 | 93 | 198 | 310 |
| Sample 5 | 61 | 101 | 150 |
| Sample 6 | 14 | 45 | 85 |
| Control | 1,200 | 7,700 | 18,000* |

*: it was formed into gel solution, the viscosity of the whole solution was determined.

As it is clear from the results shown in Table 1, the oats obtained by immersing in water and then drying (Samples 1 to 3), and the oats obtained by immersing in 0.1% aqueous WPI solution and then drying (Samples 4 to 6) had remarkably decreased viscosities, compared with the untreated oats (Control). From the results, it was proved that the viscosity of the dissolved oats could be decreased remarkably by these treatments. Further, its was proved that the effect on decreasing the viscosity of the dissolved oats could be more increased, by immersing oats in 0.1% aqueous WPI solution than in water.

TEST EXAMPLE 2

The following processed oats were prepared using instant-type oats having a degree of pressing of 0.40 mm (manufactured by Quaker Oats), and the viscosities thereof were determined.

Sample 1

Prepared by adding 1 L of water to 1 kg of the instant-type oats, and after one minute, freeze-drying 300 g of the instant-type oats.

Sample 2

Prepared by adding 1 L of water to 1 kg of the instant-type oats, and after one minute, treating 300 g of the instant-type oats at 130° C. for 30 minutes with an oven.

Sample 3

Prepared by adding 1 L of water to 1 kg of the instant-type oats, and after one minute, treating 300 g of the instant-type oats for 20 minutes with a microwave range.

Sample 4

Prepared by 1 L of 0.1% aqueous WPI (as described in Test Example 1, and so forth) solution to 1 kg of the instant-type oats, and after one minute, freeze-drying 300 g of the instant-type oats.

Sample 5

Prepared by 1 L of 0.1% aqueous WPI solution to 1 kg of the instant-type oats, and after one minute, treating 300 g of the instant-type oats at 130° C. for 30 minutes with an oven.

Sample 6

Prepared by 1 L of 0.1% aqueous WPI solution to 1 kg of the instant-type oats, and after one minute, treating 300 g of the instant-type oats for 20 minutes with a microwave range.

Control

The above untreated instant-type oats having a degree of pressing of 0.40 mm.

Each 300 g of the instant-type oats of Samples 1 to 6 and of the Control were added into 3 L of boiling water, respectively. After maintaining at 90° C. for three minutes, the oats were cooled down to 60° C., maintained at 60° C. for the periods shown in Table 2, and the viscosities were determined. The viscosities were measured with a B-type viscometer. Solids of the oats were removed as much as possible, and the viscosities of solution parts were determined. The results will be shown in Table 2.

TABLE 2

| | Viscosity (cP) | | |
|---|---|---|---|
| | After 10 min. | After 20 min. | After 30 min. |
| Sample 1 | 20 | 180 | 170 |
| Sample 2 | 11 | 120 | 97 |
| Sample 3 | 8 | 18 | 33 |
| Sample 4 | 14 | 120 | 110 |
| Sample 5 | 21 | 84 | 67 |
| Sample 6 | 3 | 9 | 15 |
| Control | 37 | 250 | 410 |

As it is clear from the results shown in Table 2, the instant-type oats obtained by immersing in water and then drying (Samples 1 to 3) and the instant-type oats obtained by immersing in 0.1% aqueous WPI solution and then drying (Samples 4 to 6) had remarkably decreased viscosities, compared with the untreated instant-type oats (Control). From the results, it was proved that the viscosities of the dissolved oats could be decreased by these treatments. Further, it was proved that the effect on decreasing the viscosities of the dissolved oats was more increased by immersing in 0.1% aqueous WPI solution than in water.

In addition, as with Samples 1 to 6, the clinging stickiness which are usually shown in instant-type oats was decreased, and turbidity of the solutions were few.

TEST EXAMPLE 3

In the Test Example, viscosities of processed oats were determined using oats having various degrees of pressing.

Namely, as to oats having each degree of pressing, (A) processed oats prepared by adding 1 L of aqueous 0.1% WPI solution to 1 kg of oats and after one minute, treating the oats at 120° C. for 30 minutes with an oven, (B) processed oats prepared by adding 1 L of water to 1 kg of oats and after one minute, treating the oats at 120° C. for 30 minutes with an oven, and (C) untreated oats, were prepared and the viscosities thereof were measured.

For each samples, as to the oats having a degree of pressing more than 0.47 mm, 300 g of sample was added to 3 L of boiling water, and it was maintained at 100° C. for three minutes, then it was cooled down to 60° C. and maintained at 60° C. for 20 minutes, and the viscosity was measured. As to the oats having a degree of pressing of 0.47 mm or less, 300 g of sample was added to 3 L of boiling water, and it was maintained at 90° C. for three minutes, then it was cooled down to 60° C. and maintained at 60° C. for 20 minutes, and the viscosity was measured. The viscosities were measured with a B-type viscometer. Solids of the oats were removed as much as possible and the viscosity of solution parts was measured. The results will be shown in Table 3.

TABLE 3

| Width | Viscosity (cP) | | |
|---|---|---|---|
| | (A) | (B) | (C) |
| 0.4 (mm) | 89 | 180 | 350 |
| 0.45 | 120 | 240 | 680 |
| 0.47 | 130 | 390 | 790 |
| 0.5 | 150 | 320 | >1,000 |
| 0.55 | 200 | 460 | >1,000 |

As it is clearly shown in Table 3, even though the degree of pressing is different, both the oats (B) prepared by immersing in water and then drying, and the oats (A) prepared by immersing in 0.1% aqueous WPI solution and then drying, had remarkably decreased viscosities compared with the untreated oats (C). It was proved that the viscosity of dissolved oats may be decreased remarkably by these treatments. Further, it was proved that the viscosity is more decreased by immersing in 0.1% aqueous WPI solution than in water.

TEST EXAMPLE 4

In the Test Example, the effects obtained by a variety of protein aqueous solutions were researched using the oats having a degree of pressing of 0.55 mm (manufactured by Quaker Oats).

Namely, 1 L of 0.5% of each of the following protein aqueous solution was added to 1 kg of oats having a degree of pressing of 0.55 mm, and the oats were immersed for one minute, then water was removed and the oats were treated at 130° C. for 30 minutes with an oven, and viscosities were measured.

300 g of each sample were added into 3 L of boiling water, and these were maintained at 100° C. for three minutes and then cooled down to 60° C. and maintained at 60° C. for 20 minutes, and the viscosity was determined. The viscosities were measured with a B-type viscometer. Solids of the oats were removed as much as possible, and the viscose of solution parts were measured. The results were shown in Table 4.

TABLE 4

| | Viscosity (cP) |
|---|---|
| Whey Protein Isolates (WPI) | 130 |
| Whey Protein Concentrates (WPC) | 130 |
| Casein | 140 |
| Swine Plasma | 150 |
| Egg-white Powder | 150 |
| Soy bean Protein | 190 |
| Whey Gluten | 480 |
| Not Added | 6,100 |

As it is clear from the results shown in Table 4, it was proved that the viscosity of the dissolved oats can be decreased more remarkably by treating with a variety of protein aqueous solution compared with the oats which are not treated with the protein aqueous solution. It was proved that the effect obtained by using an animal proteins in particular milk protein, was large.

TEST EXAMPLE 5

In the Test Example, effects obtained by a WPI aqueous solution having a variety of concentration were researched, using the oats having a degree of pressing of 0.55 mm (manufactured by Quaker Oats).

Namely, 1 L of aqueous protein solution having each of the following WPI concentration were added to 1 kg of oats having a degree of pressing of 0.55 mm, respectively, and after one minute, the oats were treated at 130° C. for 30 minutes with an oven, and viscosities were measured.

300 g of each sample were added into 3 L of boiling water, and these were maintained for three minutes, and then cooled down to 60° C., maintained at the temperature for 20 minutes, and the viscosities were determined. The viscosities were measured with a B-type viscometer. Solids of the oats were removed as much as possible, and the viscosities of solution parts were measured. The results were shown in Table 5.

TABLE 5

| WPI Concentration (%) | Viscosity (cP) |
|---|---|
| 0 | 6,800 |
| 0.01 | 480 |
| 0.1 | 93 |
| 1 | 60 |
| 10 | 31 |

As it is clear from the results shown in Table 5, it was proved that the higher the concentration of the protein aqueous solution in which oats were immersed, the lower the viscosity of the dissolved oats becomes.

As described above, it can be concluded that (1) the viscosity of dissolved oats may be decreased remarkably by immersing the oats into water and then drying, or by immersing the oats into aqueous WPI solution, that (2) the above (1) effect is larger by immersing oats in WPI aqueous solution than in water, that (3) even with the instant-type oats, the similar effect may be obtained as the above (1) and (2) effects, that (4) the viscosity of oats may be decreased also by the treatment of immersing oats into a variety protein solution other than WPI and then drying, in particular, effect obtained by using an animal protein is large, and that (5) the higher the concentration of aqueous protein solution the lower the viscosity of the dissolved oats becomes, and the like.

Embodiments

The present invention will be explained in more detail with the following Examples, hereinafter. In the Examples, all "%" and "part" are to show "weight %" and "part by weight", respectively, unless otherwise specified.

EXAMPLE 1

After spraying 20 L of 2% aqueous casein solution onto 10 kg of oats having a degree of pressing of 0.55 mm, it was dried at 100° C. for 40 minutes with a continuous-type oven to obtain processed oats.

Each 100 g of the processed oats and of untreated oats were added into 1 L of boiling water, respectively, and these were maintained at 100° C. for three minutes. Then, these were maintained at 60° C., and after 20 minutes, the viscosities of the liquid parts of each of the oats solution were determined. The viscosity of the processed oats was 121 cP, whereas that of the untreated oats was 8,200 cP. In addition, as to the processed oats, the turbidity and the peculiar oats odor were decreased compared with the untreated oats.

EXAMPLE 2

500 ml of water was added to 1 kg of oats having a degree of pressing of 0.4 mm, and after leaving for 10 minutes, these were dried sufficiently with a microwave range to obtain processed oats.

Each 100 g of the processed oats and of untreated oats were added into 1 L of boiling water, respectively, and these were maintained at 100° C. for three minutes. Then, these were maintained at 60° C., and after 20 minutes, the viscosities of the liquid parts of each of the oats solutions were determined. The viscosity of the processed oats was 23 cP, whereas that of the untreated oats was 290 cP. In addition, as to the processed oats, the turbidity and the peculiar oats odor were decreased compared with the untreated oats.

EXAMPLE 3

0.5 L of 0.05% aqueous soy bean protein solution was added to 1 kg of oats having a degree of pressing of 0.45 mm, and after leaving for 10 minutes, these were freeze-dried to obtain processed oats.

Each 100 g of the processed oats and of untreated oats were added into 1 L of boiling water, respectively, and these were maintained at 90° C. for three minutes. Then these were maintained at 60° C., and after 20 minutes, the viscosities of the solution parts of each of the oats solutions were determined. The viscosity of the processed oats was 165 cP, whereas that of the untreated oats was 410 cP. In addition, as to the processed oats, the turbidity and the peculiar oats odor were decreased compared with the untreated oats.

EXAMPLE 4

0.1 L of 10% aqueous sodium casein solution was sprayed onto 1 kg of oats which had not been pressed yet, and these were dried by heating at 140° C. Then, these were pressed with a roller to obtain processed oats having a degree of pressing of 0.5 mm.

Each 100 g of the processed oats and of untreated oats were added into 1 L of boiling water, respectively, and these were maintained at 100° C. for three minutes. Then, these were maintained at 60° C., and after 20 minutes, the viscosities of the liquid parts of each of the oats solution were determined. The viscosity of the processed oats was 40 cP, whereas that of the untreated oats was 830 cP. In addition, as to the processed oats, the turbidity and the peculiar oats odor were decreased compared with the untreated oats.

EXAMPLE 5

6 kg of aqueous solution containing 10% of egg-white albumin (manufactured by kewpie Co.) was sprayed onto 20 kg of oats having a degree of pressing of 0.4 mm with a batch-type fluidized bed granulator. Further, the oats were dried in the granulator (70° C.) to obtain processed oats.

Each 100 g of the processed oats and of untreated oats were added into 1 L of boiling water, respectively, and these were maintained at 90° C. for three minutes. Then, these were maintained at 60° C., and after 20 minutes, the viscosity of the liquid part of each of the oats solution were determined. The viscosity of the processed oats was 52 cP, whereas that of the untreated oats was 320 cP. In addition, as to the processed oats, the turbidity and the peculiar oats odor were decreased compared with the untreated oats.

EXAMPLE 6

Using the processed oats obtained in Example 2, an instant-type 'Ochazuke' (rice-in-tea) was prepared by a conventional method with the following components.

| | |
|---|---|
| Processed Oats | 20 (g) |
| Seasoning | 3 |
| Laver | 0.3 |
| Pickled 'Ume' (Japanese apricot) Flakes | 0.5 |
| Hot Water | 170 |

The obtained 'Ochazuke' had neither stickiness nor oats odor even when bitten, and it can be eaten very easily and preferably. Moreover, the 'Ochazuke' had no turbidity and thus it was preferable in appearance.

EXAMPLE 7

Using the processed oats obtained in Example 3, an instant-type 'Okayu' (rice gruel) was prepared by a conventional method with the following components.

| | |
|---|---|
| Processed Oats | 20 (g) |
| Seasoning | 3.4 |
| Carrot Flakes | 0.4 |
| Spinach Flakes | 0.3 |
| Hot Water | 170 |

The obtained 'Okayu' had neither stickiness nor oats odor which were peculiar to oats, and had a preferable mouth feel. Moreover, the 'Okayu' had no turbidity and thus it was preferable in appearance.

The processed oats of the present invention have a remarkably decreased viscosity when dispersed in hot water or boiling water. Thus the processed oats of the present invention will be a new food material having a new mouth feel.

Further, since the processed oats of the present invention have a decreased oats odor and a decreased turbidity of the solution, and have a decreased stickiness occurred when oat grains are bitten, the people who hate the stickiness or odor which are peculiar to oats, could eat the processed oats very easily and preferably. Therefore, it is expected that a demand of oats is increased and that a utilization of oats as a raw material for various foods is extended by the present invention.

What is claimed is:

1. Pressed processed oats having a degree of pressing of 0.47 mm or less and a viscosity of 180 cP or less when dispersed in a solution containing said pressed processed oats and hot or boiling water, wherein the viscosity of said solution is determined by measuring the viscosity after adding one part by weight of said pressed processed oats to ten parts by weight of boiling water, heating and maintaining said solution at 90° C. for three minutes, and then maintaining said solution at 60° C. for 20 minutes.

2. A food containing the pressed processed oats as claimed in claim 1.

3. A beverage containing the pressed processed oats as claimed in claim 1.

4. A method of preparing pressed processed oats, wherein the viscosity of a solution containing said pressed processed oats and hot or boiling water is 350 cP or less and is determined by measuring the viscosity after adding one part by weight of said pressed processed oats to ten parts by weight boiling water, heating said solution at 100° C. for three minutes, and then maintaining said solution at 60° C. for 20 minutes, comprising the steps of contacting unpressed oats with an aqueous protein solution, drying the oats, and then pressing the oats.

5. A method of preparing pressed processed oats which have a viscosity of 350 cP or less when combined with water, wherein the viscosity of a solution containing said pressed processed oats and water is determined by measuring the viscosity after adding one part by weight of said pressed processed oats to ten parts by weight boiling water, heating said solution at 100° C. for three minutes, and then maintaining said solution at 60° C. for 20 minutes, comprising the steps of contacting unpressed oats with an aqueous animal protein solution, drying the oats, and then pressing the oats.

6. A method of preparing pressed processed oats which have a viscosity of 350 cP or less when combined with water, wherein the viscosity of a solution containing said pressed processed oats and water is determined by measuring the viscosity after adding one part by weight of said pressed processed oats to ten parts by weight boiling water, heating said solution at 100° C. for three minutes, and then maintaining said solution at 60° C. for 20 minutes, comprising the steps of contacting unpressed oats with an aqueous vegetable protein solution, drying the oats, and then pressing the oats.

7. A method of preparing pressed processed oats which have a viscosity of 350 cP or less when combined with water, wherein the viscosity of a solution containing said pressed processed oats and water is determined by measuring the viscosity of the solution after adding one part by weight of said pressed processed oats to ten parts by weight boiling water, heating said solution at 100° C. for three minutes, and then maintaining said solution at 60° C. for 20 minutes, comprising the steps of contacting unpressed oats with an aqueous spherical protein solution, drying the oats, and then pressing the oats.

8. A method of preparing pressed processed oats which have a viscosity of 350 cP or less when combined with water, wherein the viscosity of a solution containing said pressed processed oats and water is determined by measuring the viscosity of the solution after adding one part by weight of said pressed processed oats to ten parts by weight boiling water, heating said solution at 100° C. for three minutes, and then maintaining said solution at 60° C. for 20 minutes, comprising the steps of contacting unpressed oats with an aqueous protein solution, drying the oats, and then pressing the oats, and wherein the aqueous protein solution has a concentration of the protein of 0.01 to 40 weight %.

9. A method of preparing pressed processed oats having a degree of pressing of 0.47 mm or less and a viscosity of 180 cP or less in a solution containing said pressed processed oats and hot or boiling water, wherein the viscosity of the solution is determined by measuring the viscosity after adding one part by weight of said pressed processed oats to ten parts by weight of boiling water, maintaining said solution at 90° C. for three minutes, and then maintaining said solution at 60° C. for 20 minutes, comprising the steps of contacting pressed oats with water, and then drying the oats.

10. A method of preparing pressed processed oats having a degree of pressing of 0.47 mm or less and a viscosity of 180 cP or less in a solution containing said pressed processed oats and hot or boiling water, wherein the viscosity of said solution is determined by measuring the viscosity after adding one part by weight of said pressed processed oats to ten parts by weight of boiling water, maintaining said solution at 90° C. for three minutes, and then maintaining said solution at 60° C. for 20 minutes, comprising the steps of contacting pressed oats with an aqueous protein solution, and then drying the oats.

11. A method of preparing pressed processed oats having a degree of pressing of 0.47 mm or less and a viscosity of 180 cP or less in a solution containing said pressed processed oats and hot or boiling water, wherein the viscosity of said solution is determined by measuring the viscosity after adding one part by weight of said pressed processed oats to ten parts by weight of boiling water, maintaining said solution at 90° C. for three minutes, and then maintaining said solution at 60° C. for 20 minutes, comprising the steps of contacting pressed oats with an aqueous protein solution, and then drying the oats, and then pressing the oats.

* * * * *